United States Patent [19]
Coutant et al.

[11] Patent Number: 5,553,453
[45] Date of Patent: Sep. 10, 1996

[54] METHOD FOR PROVIDING DIFFERENT SPEED RANGES FOR A SPEED PEDAL

[75] Inventors: Alan R. Coutant, Chillicothe; Sanjay Rajagopalan, Peoria, both of Ill.

[73] Assignee: Caterpillar, Inc., Peoria, Ill.

[21] Appl. No.: 443,843

[22] Filed: May 18, 1995

[51] Int. Cl.$^6$ .............................. F16D 31/00; B60K 17/00
[52] U.S. Cl. .................... 60/327; 60/448; 180/307
[58] Field of Search ........................... 60/327, 445, 448, 60/487, 490, 452; 180/307, 176, 177, 179

[56] References Cited

U.S. PATENT DOCUMENTS

| | | | |
|---|---|---|---|
| 4,368,798 | 1/1983 | Meyerle et al. | 60/448 X |
| 4,530,416 | 7/1985 | Kassai | 60/490 X |
| 4,554,992 | 11/1985 | Kassai | 60/451 X |
| 4,693,081 | 9/1987 | Nakamura et al. | 60/445 X |
| 5,249,421 | 10/1993 | Lunzman | 60/452 X |
| 5,267,441 | 12/1993 | Devier et al. | 60/452 |
| 5,279,122 | 1/1994 | Shirai et al. | 60/452 |
| 5,317,871 | 6/1994 | Ito et al. | 60/452 |
| 5,331,812 | 7/1994 | Imai | 60/452 X |
| 5,481,875 | 1/1996 | Takamura et al. | 60/452 X |

*Primary Examiner*—John E. Ryznic
*Attorney, Agent, or Firm*—J. W. Burrows

[57] ABSTRACT

A method is disclosed for providing different speed ranges for a speed pedal in a continuously variable transmission having a closed loop control. The method comprises the steps of monitoring the output speed of the continuously variable transmission, monitoring the position of the speed pedal relative to the transmission output speed, establishing a plurality of control maps each having the same travel distance of a speed pedal but different speed ranges, and selecting the desired speed range relating to one of the plurality of control maps. This enables the operator to select a speed range to fit the operation, such as, travelling from one location to another, maneuvering, or loading a truck.

5 Claims, 2 Drawing Sheets

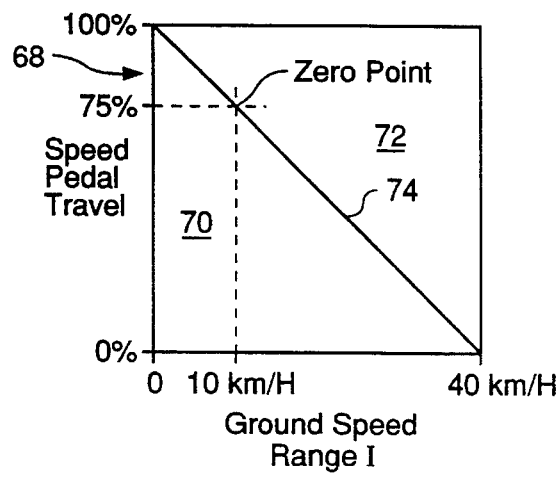
Fig-2-
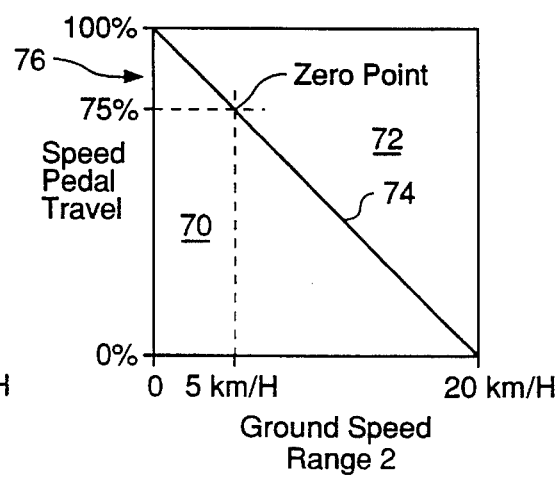
Fig-3-
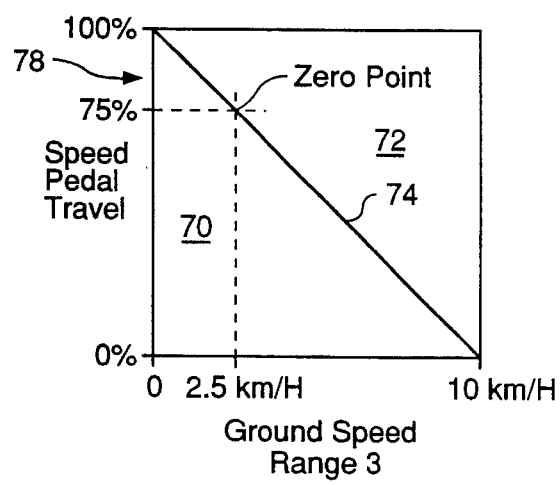
Fig-4-
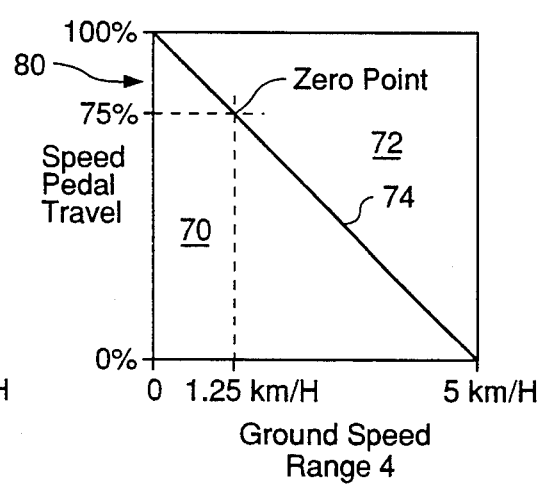
Fig-5-

5,553,453

METHOD FOR PROVIDING DIFFERENT SPEED RANGES FOR A SPEED PEDAL

TECHNICAL FIELD

This invention relates generally to the use of a speed pedal to control the movement of a machine and more particularly to a method for providing different speed ranges for a speed pedal in a machine system having a closed loop control.

BACKGROUND ART

In many known systems, in order to obtain different speed conditions for the total travel of the speed pedal, it was necessary to have several discrete steps or gear changes in the transmission. Consequently, the operator had to shift the transmission from one gear to the other in order to obtain different speed ranges for the same given pedal travel. When a machine is being operated in a high speed range, each increment of speed pedal travel does not provide the finite speed control desired when, for example, loading a truck or some other function. In order to have the benefits of both a continuously variable transmission and a high speed range, it is beneficial to be able to have a more precise control of the machine speed at lower speeds while still maintaining the high speed capability.

The subject invention is directed to overcoming one or more of the problems as set forth above.

DISCLOSURE OF THE INVENTION

In one aspect of the present invention, a method is set forth for providing different operating speed ranges for a speed pedal in a machine having a continuously variable transmission with a closed loop control. The method comprises the steps of monitoring the output speed of the continuously variable transmission, monitoring the position of the speed pedal relative to the transmission output speed, and establishing a first predetermined control map that is effective to accelerate or retard the continuously variable transmission in response to the position of the speed pedal to maintain a zero point along a zero line on the first predetermined control map for a first predetermined output speed range of the continuously variable transmission. The first predetermined control map having a first region relating to acceleration of the continuously variable transmission and a second region relating to retarding of the continuously variable transmission with the zero line defined therebetween along which there is no accelerating or retarding of the continuously variable transmission. The method also includes establishing a second predetermined control map that is effective to accelerate or retard the continuously variable transmission in response to the position of the speed pedal to maintain a zero point along a zero line on the second predetermined control map for a second predetermined output speed range of the continuously variable transmission. The second predetermined control map having a first region relating to acceleration of the continuously variable transmission and a second region relating to retarding of the continuously variable transmission with the zero line defined therebetween along which there is no accelerating or retarding of the continuously variable transmission. The method further includes selecting the desired one of the first and second predetermined output speed ranges.

The present invention provides a method that permits a single speed pedal to control movement of the machine throughout the pedal's full travel during several different speed ranges without the need to have a discrete gear type transmission.

BRIEF DESCRIPTION OF THE DRAWINGS

FIG. 2 is a first control map illustrating the relationship between a speed pedal position and the output speed of the machine through a first operating speed range;

FIG. 3 is a second control map illustrating the relationship of FIG. 2 through a second operating speed range;

FIG. 4 is a third control map illustrating the relationship of FIG. 2 through a third operating speed range; and FIG. 5 is a fourth control map illustrating the relationship of FIG. 2 through a fourth operating speed range.

BEST MODE FOR CARRYING OUT THE INVENTION

Figure 1:
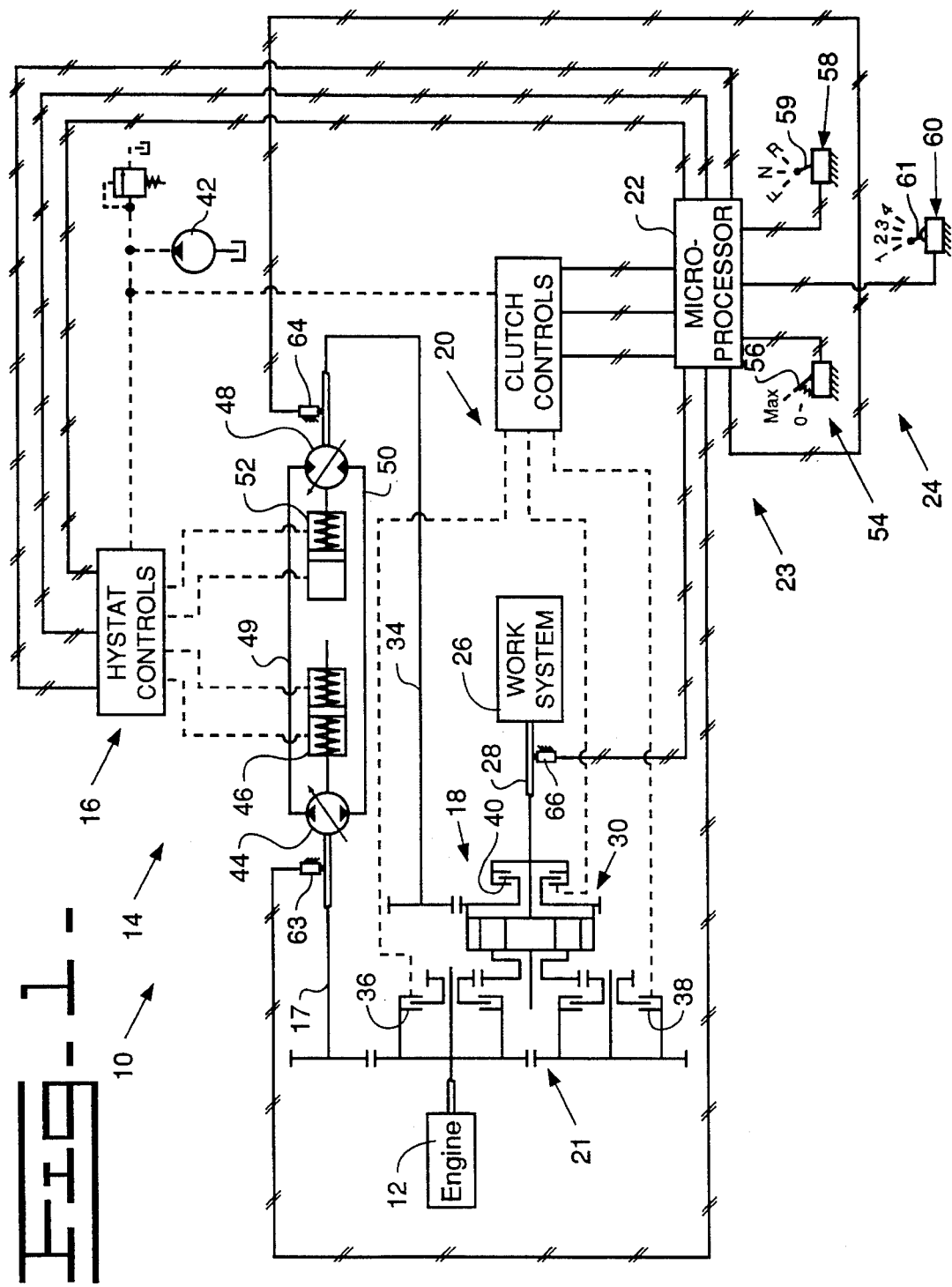
FIG. 1 is a part schematic and part diagrammatic illustration of a machine system which utilizes the subject method.

Referring to FIG. 1 of the drawings, a continuously variable transmission 10 is illustrated for use on a machine (not shown) having an engine 12. The continuously variable transmission 10 includes a hydrostatic transmission 14 and its associated hystat control arrangement 16 operatively connected to the engine 12 through a pump input drive shaft 17, a mechanical transmission 18 and its associated clutch control arrangement 20 operatively connected to the engine 12 through a gear arrangement 21, a microprocessor 22 operatively connected to the hystat control arrangement 16 of the hydrostatic transmission 14 and the clutch control arrangement 20 of the mechanical transmission 18, a sensing arrangement 23, and a command (operator's) input arrangement 24. A work system 26 is connected to the continuously variable transmission 10 by a final drive shaft 28.

The mechanical transmission 18 includes a summing planetary arrangement 30 operatively connected to both the engine 12 through the gear arrangement 21 and to the hydrostatic transmission 14 through a motor output shaft 34. The output of the summing planetary arrangement 30 is connected to the final drive shaft 28. The mechanical transmission 18 also includes directional and high speed clutches 36,38 and a low speed clutch 40. The clutch control arrangement 20 is connected to a source of pressurized pilot fluid, such as a pilot pump 42 and the microprocessor 22 and operative in response to receipt of electrical signals from the microprocessor 22 to control engagement and disengagement of the respective speed clutches 36,38,40.

The hydrostatic transmission 14 includes a variable displacement pump 44, a pump displacement controller 46, a variable displacement motor 48 fluidly connected to the variable displacement pump 44 by conduits 49,50, and a motor displacement controller 52. The hystat control arrangement 16 is connected to the pilot pump 42 and the microprocessor 22 and operative in response to receipt of electrical signals from the microprocessor 22 to control movement of the respective pump and motor displacement controllers 46,52.

The command input arrangement 24 includes a speed input mechanism 54 having a speed pedal 56, a direction control mechanism 58 having a direction control lever 59 and a speed range selector mechanism 60 having a selector lever 61. The speed pedal 56 is movable from a maximum speed position to a zero speed position. The direction control lever 59 is movable from a neutral position to either a forward or reverse position. The selector lever 61 is movable between first, second, third and fourth speed ranges.

The sensing arrangement 23 includes a first speed sensor 63 operative to sense the speed of the pump input shaft 17 and direct an electrical signal representative thereof to the microprocessor 22. A second speed sensor 64 is operative to sense the speed of the motor output shaft 34 and direct an electrical signal representative thereof to the microprocessor 22. A third speed sensor 66 is operative to sense the speed of the final drive shaft 28 and direct an electrical signal representative thereof to the microprocessor 22.

Referring to FIG. 2, a first control map 68 is illustrated. The vertical axis of the control map 68 relates to the position of the speed pedal 56 between its zero travel position (0%) and its maximum travel position (100%). The horizontal axis relates to the speed of the machine or the output of the transmission between zero speed (0%) and maximum speed (100%) when being operated in a first speed range, for example, zero to 40 kilometers per hour (approximately 24 mph). The control map 68 generally indicates the relationship between the operator's "intent" or speed command input made through the speed pedal 56 and whether the machine accelerates or retards when the speed pedal 56 is moved from one position to another. The control map 68 is divided into first and second regions 70,72 having a zero line 74 defined therebetween. The zero line 74 represents a zone where there is no accelerating or retarding of the machine. In other words, when the output speed of the final drive shaft 28 to the work system 26 has reached the desired speed as dictated by the position of the speed pedal 56, a zero point is reached along the zero line. The zero point is the point at when acceleration or retardation of the machine is terminated. In the example of FIG. 2, if the speed pedal 56 is depressed to 75% of its total travel, the resulting speed of the machine is 10 kilometers per hour (approximately 6 mph). Further moment of the speed pedal 56 results in the continuously variable transmission 10 either increasing or decreasing the speed of the final drive shaft 28. The first region 70 of the control map 68 relates to a zone of machine acceleration and the second region 72 relates to a zone of machine retardation.

Referring to FIG. 3, another control map 76 is illustrated. The control map 76 of FIG. 3 is substantially the same as the control map 68 and all corresponding elements have like element numbers. The main difference is that the horizontal axis relates to operating the machine in a second speed range, for example, zero to 20 kilometers per hour (approximately 12 mph). In the example of FIG. 3, depressing the speed pedal 56 75% of its total travel results the machine travelling at 5 kilometers per hour (approximately 3 mph).

Referring to FIG. 4, another control map 78 is illustrated. The control map 78 of FIG. 4 is substantially the same as the control map 68 and all corresponding elements have like element numbers. The main difference is that the horizontal axis relates to operating the machine in a third speed range, for example, zero to 10 kilometers per hour (approximately 6 mph). In the example of FIG. 4, depressing the speed pedal 56 75% of its total travel results the machine travelling at 2.5 kilometers per hour (approximately 1.5 mph).

Referring to FIG. 5, another control map 80 is illustrated. The control map 80 of FIG. 5 is substantially the same as the control map 68 and all corresponding elements have like element numbers. The main difference is that the horizontal axis relates to operating the machine in a fourth speed range, for example, zero to 5 kilometers per hour (approximately 3 mph). In the example of FIG. 5, depressing the speed pedal 56 75% of its total travel results the machine travelling at 1.25 kilometers per hour (approximately 0.75 mph).

It is recognized that various forms of the subject arrangement could be utilized without departing from the essence of the invention. For example, the zero line 74 on each of the control maps 68,76,78,80 could be non-linear as opposed to being straight. Likewise, the speed pedal 56 could control the speed of the machine between zero speed and maximum speed as opposed to controlling the machine speed between maximum and zero speed. Additionally, each of the various speed ranges may, or may not, have additional constraints applied, such as, the maximum speed of range 1 is greater that of range 2, the speed of range 2 is greater than range 3, etc. Furthermore, in addition to using a selector lever 61 to select the desired speed range, increment or decrement switches or buttons could be positioned in the operator's cab so that the operator could push the respective switches or buttons to incrementally increased or decrease the maximum operating speed in any of the speed ranges. In each situation, once the operator has selected a particular speed range, a new control map would be generated relating to a desired new maximum speed and the acceleration or retardation of the machine would be controlled according to the newly generated control map.

Industrial Applicability

In the operation of the subject embodiment, a directional input is made to the directional lever 59 to select the direction of travel and a desired operating speed range input is made to the speed range selector lever 61 to select the desired speed range of the machine. In the subject arrangement, with the speed pedal 56 in the zero travel position and the selector lever 61 in speed range "1", the continuously variable transmission 10 accelerates to its maximum speed of 40 kilometers per hour. To accomplish this acceleration, the microprocessor 22 receives the electrical signals representing the respective positions of the speed pedal 56, the selector lever 61 and the direction lever 59, processes the commands representing the operator's intent and directs the appropriate signals to the hystat control arrangement 16 and the clutch control arrangement 20. In the subject arrangement, with the selector lever 61 in speed range "1", the controls responds to the control map 68 of FIG. 2. Initially, the hydrostatic transmission 14 increases the speed of the machine by adjusting the respective displacements of the variable displacement pump 44 and the variable displacement motor 48 and then controlling the respective speed clutches 36,38,40 to continue the increase in machine speed. Following actuation of the high speed clutch, further speed increases are accomplished by controlling the speed of the ring gear of the summing planetary arrangement. Once the desired maximum speed condition of 40 kilometers per hour is reached, the microprocessor 22 maintains the machine speed constant with no accelerating or retarding of the machine.

If the operator depresses the speed pedal 56 to 75% of its travel distance, the machine speed would decrease since, as previously noted, the machine was traveling at its maximum speed. With reference to the control map of FIG. 2, when the speed pedal 56 is depressed to 75% of its total travel, the machine would retard, slow down, until the speed of the machine reaches the speed required by the position of the speed pedal 56. This is accomplished by the microprocessor 22 continuously monitoring, through the third sensor 66, the output speed of the final drive shaft 28 and comparing the sensed speed to the desired speed as sensed by the signal from the position of the speed pedal 56. As the speed reduces, the relationship between the position of the speed pedal 56 and the machine speed is compared on the control map 68. Once the zero point is achieved on the zero line 74, the microprocessor 22 directs the appropriate signals to the respective hystat controls 16 and the clutch controls 20, as needed, to maintain the speed of the machine constant at 10 kilometers per hour with no acceleration or retardation. As long as the operator does not change the position of the speed pedal 56, the speed of the machine remains constant at 10 kilometers per hour.

Referring to the operation of the control map 76 of FIG. 3. The overall operation of the second control map 76 is the same as that of the control map 68 of FIG. 2. The main difference is that the control map 76 of FIG. 3 relates to operation of the machine in a second speed range. Once the operator moves the selector lever 61 to speed range "2", the machine travels at a speed between zero speed and 20 kilometers per hour. In speed range "2", the maximum speed of the machine is 20 kilometers per hour and with the speed pedal 76 depressed to 75% of its total travel distance, the resulting speed of the machine is 5 kilometers per hour as compared to 10 kilometers per hour for the same speed pedal 56 position of the control map 68 of FIG. 2. Consequently, when operating the machine in the speed range "2", each increment of travel of the speed pedal 56 results in a lesser change in speed of the machine. Therefore, the operator has a more precise control of the machine speed during maneuvering or loading.

Referring to the operation of the control map 78 of FIG. 4. The overall operation of the third control map 78 is the same as that of the control map 68 of FIG. 2. The main difference is that the control map 78 of FIG. 4 relates to operation of the machine in a third speed range. Once the operator moves the selector lever 61 to speed range "3", the machine travels at a speed between zero speed and 10 kilometers per hour. In speed range "3", the maximum speed of the machine is 10 kilometers per hour and with the speed pedal 76 depressed to 75% of its total travel distance, the resulting speed of the machine is 2.5 kilometers per hour as compared to 10 kilometers per hour for the same position of the speed pedal 56 of the control map 68 of FIG. 2. Consequently, when operating the machine in the speed range "3", each increment of travel of the speed pedal 56 results in yet a lesser change in speed of the machine. Therefore, the operator has an even greater control of the machine during maneuvering or loading.

Referring to the operation of the control map 80 of FIG. 5. The overall operation of the fourth control map 80 is the same as that of the control map 68 of FIG. 2. The main difference is that the control map 78 of FIG. 4 relates to operation of the machine in a fourth speed range. Once the operator moves the selector lever 61 to speed range "4", the machine travels at a speed between zero speed and 5 kilometers per hour. In speed range "4", the maximum speed of the machine is 5 kilometers per hour and with the speed pedal 76 depressed to 75% of its total travel distance, the resulting speed of the machine is 1.25 kilometers per hour as compared to 10 kilometers per hour for the same position of the speed pedal 56 of the control map 68 of FIG. 2. Consequently, when operating the machine in the speed range "4", each increment of travel of the speed pedal 56 results in a much finer change in speed of the machine. Therefore, the operator has a very precise control of the machine speed during maneuvering or loading.

Thus the method for providing different operating speed ranges for a speed pedal in a machine having a continuously variable transmission having a closed loop control comprises the steps of monitoring the output speed of the continuously variable transmission, monitoring the position of the speed pedal relative to the transmission output speed, establishing a first predetermined control map 68 that is effective to accelerate or retard the continuously variable transmission in response to the position of the speed pedal to maintain a zero point along a zero line 74 on the first predetermined control map for a first predetermined output speed range of the continuously variable transmission, establishing a second predetermined control map 76 that is effective to accelerate or retard the continuously variable transmission in response to the position of the speed pedal to maintain a zero point along the zero line on the second predetermined control map for a second predetermined output speed range of the continuously variable transmission, and selecting the desired one of the first and second predetermined output speed ranges. Each of the first and second predetermined control map having a first region 70 relating to acceleration of the continuously variable transmission and a second region 72 relating to retarding of the continuously variable transmission with the zero line defined therebetween along which there is no accelerating or retarding of the continuously variable transmission. Additionally, the method includes the step of establishing a third predetermined control map 78 that is effective to accelerate or retard the continuously variable transmission in response to the position of the speed pedal to maintain a zero point along the zero line on the third predetermined control map for a third predetermined output speed range of the continuously variable transmission. Furthermore, the method includes the step of establishing a fourth predetermined control map 80 that is effective to accelerate or retard the continuously variable transmission in response to the position of the speed pedal to maintain a zero point along the zero line on the fourth predetermined control map for a fourth predetermined output speed range of the continuously variable transmission. Likewise, the method includes the step of selecting the desired one of the first, second, third, or fourth predetermined output speed ranges.

In view of the foregoing, it is readily apparent that the subject method provides a process for providing different operating speed ranges for a speed pedal in a machine having a continuously variable transmission with a closed loop control to enable the operator to select various speed ranges of the machine and control the speed of the machine with the same speed pedal in order to more precisely control the speed of the machine with respect to the desired operating mode, such as, for example, travelling, maneuvering, or loading.

Other aspects, objects and advantages of the invention can be obtained from a study of the drawings, the disclosure and the appended claims.

We claim:

1. A method for providing different operating speed ranges for a speed pedal in a machine having a continuously variable transmission with a closed loop control, comprising the steps of:

monitoring the output speed of the continuously variable transmission;

monitoring the position of the speed pedal relative to the transmission output speed;

establishing a first predetermined control map that is effective to accelerate or retard the continuously variable transmission in response to the position of the speed pedal to maintain a zero point along a zero line on the first predetermined control map for a first predetermined output speed range of the continuously variable transmission, the first predetermined control map having a first region relating to acceleration of the continuously variable transmission and a second region relating to retarding of the continuously variable transmission with the zero line defined therebetween along which there is no accelerating or retarding of the continuously variable transmission;

establishing a second predetermined control map that is effective to accelerate or retard the continuously variable transmission in response to the position of the speed pedal to maintain a zero point along a zero line on the second predetermined control map for a second predetermined output speed range of the continuously variable transmission, the second predetermined control map having a first region relating to acceleration of the continuously variable transmission and a second region relating to retarding of the continuously variable transmission with the zero line defined therebetween along which there is no accelerating or retarding of the continuously variable transmission; and selecting the desired one of the first and second predetermined output speed ranges.

2. The method of claim 1 wherein the step of selecting includes moving a selector switch or lever.

3. The method of claim 2 wherein in the steps of establishing the first and second predetermined control maps the zero line is a linear line.

4. The method of claim 1 including the step of establishing a third predetermined control map that is effective to accelerate or retard the continuously variable transmission in response to the position of the speed pedal to maintain a zero point along a zero line on the third predetermined control map for a third predetermined output speed range of the continuously variable transmission, the third predetermined control map having a first region relating to acceleration of the continuously variable transmission and a second region relating to retarding of the continuously variable transmission with the zero line defined therebetween along which there is no accelerating or retarding of the continuously variable transmission and the step of selecting includes selecting the desired one of the first, second, or third predetermined output speed ranges.

5. The method of claim 4 including the step of establishing a fourth predetermined control map that is effective to accelerate or retard the continuously variable transmission in response to the position of the speed pedal to maintain a zero point along a zero line on the fourth predetermined control map for a fourth predetermined output speed range of the continuously variable transmission, the fourth predetermined control map having a first region relating to acceleration of the continuously variable transmission and a second region relating to retarding of the continuously variable transmission with the zero line defined therebetween along which there is no accelerating or retarding of the continuously variable transmission and the step of selecting includes selecting the desired one of first, second, third, or fourth predetermined output speed ranges.

* * * * *